(12) United States Patent
Bamford et al.

(10) Patent No.: US 8,740,154 B2
(45) Date of Patent: Jun. 3, 2014

(54) SPACECRAFT SHIELD

(75) Inventors: Ruth Bamford, Oxon (GB); Robert Bingham, Oxon (GB)

(73) Assignee: The Science and Technology Facilities Council, Oxon (GB)

( * ) Notice: Subject to any disclaimer, the term of this patent is extended or adjusted under 35 U.S.C. 154(b) by 370 days.

(21) Appl. No.: 12/990,420

(22) PCT Filed: Mar. 26, 2010

(86) PCT No.: PCT/GB2010/000588
§ 371 (c)(1),
(2), (4) Date: Oct. 29, 2010

(87) PCT Pub. No.: WO2010/109207
PCT Pub. Date: Sep. 30, 2010

(65) Prior Publication Data
US 2011/0049303 A1 Mar. 3, 2011

(30) Foreign Application Priority Data
Mar. 26, 2009 (GB) .................................. 0905238.2

(51) Int. Cl.
*B64G 1/52* (2006.01)
(52) U.S. Cl.
USPC ....................................... 244/171.7; 335/301
(58) Field of Classification Search
USPC ............ 244/171.7, 166; 250/515.1; 335/210, 335/211, 212, 301
See application file for complete search history.

(56) References Cited

U.S. PATENT DOCUMENTS

| | | | |
|---|---|---|---|
| 4,033,524 A | 7/1977 | Brice et al. | |
| 4,438,168 A | 3/1984 | Testard | |
| 5,234,183 A | 8/1993 | Hammer | |
| 2005/0230525 A1 | 10/2005 | Paterro | |
| 2006/0169489 A1 | 8/2006 | Kinstler | |

FOREIGN PATENT DOCUMENTS

| | | |
|---|---|---|
| CN | 2011-69388 Y | 12/2008 |
| EP | 1 739 016 A1 | 1/2007 |
| JP | H0418498 A | 8/1992 |
| JP | 4-339100 A | 11/1992 |
| JP | 11-223697 A | 8/1999 |
| JP | 2005-317698 A | 11/2005 |

OTHER PUBLICATIONS

Bamford, R. et al., "Shields for the Starship Enterprise", Astronomy and Geophysics, vol. 48, Issue 6, Dec. 2007, pp. 6.18-6.23.
Bamford, R., "The Interaction of a Flowing Plasma with a Dipole Magnetic Field: Measurements and Modelling of a Diamagnetic Cavity Relevant to Spacecraft Protection", Plasma Physics and Controlled Fusion, Nov. 4, 2008, pp. 1-11.
Cocks, J. C. et al., "Applications for Deployed High Temperature Superconducting Coils in Spacecraft Engineering: A Review and Analysis", Journal of the British Interplanetary Society, vol. 50, 1997, pp. 479-484.

(Continued)

*Primary Examiner* — Rob Swiatek
*Assistant Examiner* — Timothy Schwarz
(74) *Attorney, Agent, or Firm* — Birch, Stewart, Kolasch & Birch, LLP

(57) ABSTRACT

A spacecraft is described which uses a magnetic field source to generate a shield magnetic field to protect the spacecraft from energetic charged particles. The field may be perturbed to increase the effectiveness of the protection. Injection of material into the shield cavity to enhance the local plasma density may also be used.

30 Claims, 2 Drawing Sheets

(56) References Cited

OTHER PUBLICATIONS

Levy, R. H. et al., "Plasma Radiation Shield: Concept and Applications to Space Vehicles", J. Spacecraft, vol. 5, No. 5, May 1968, pp. 570-577.

Townsend, Lawrence W. "Critical Analysis of Active Shielding Methods for Space Radiation Protection." Aerospace Conference, 2005. IEEE paper #1094, Version 6. Dec. 1, 2004.

Peng, Tao, "Technical Development of Stong Pulsed Magnet" Nuclear Techniques 26:3:185-188 (Mar. 2003).

SPACECRAFT SHIELD

FIELD OF THE INVENTION

The invention relates to spacecraft, and to the shielding of spacecraft from potentially harmful charged particles. Such charged particles may include, for example, high energy protons which arise during a Solar Proton Event.

INTRODUCTION

The space environment is hazardous both to spacecraft and astronauts, because of a variety of radiation types including high energy photons such as cosmic rays and solar Gamma and X-rays, and high energy particles such as solar energetic particles (SEPs). SEPs notably include significant fluxes of protons and electrons with energies of tens to several hundreds of MeV which are generated by solar proton events linked to coronal mass ejections and solar flares. Solar proton events cause particular concern because although they are typically infrequently experienced by a particular satellite (perhaps a few events in a week, depending on solar activity) and of short duration (hours to days), they have the potential to do significant rapid damage, especially to satellites in higher altitude orbits such as geosynchronous earth orbit (GEO), where there is less natural protection from the Earth's own magnetosphere, or to interplanetary spacecraft.

Electronic components carried by spacecraft are increasingly vulnerable to radiation damage as the size of functional elements such as logic circuits and digital memory reduces. Although electronic components can be designed with redundancy against modest levels of radiation damage, it is a known operational technique to turn off radiation sensitive electronics in communications satellites when a solar proton event is anticipated.

DISCUSSION OF PRIOR ART

Radiation shields for spacecraft have been considered, for example, in Levy and French "Plasma radiation shield—Concept and applications to space vehicles", *J. of Space Craft and Rockets*, 5, 570-577, 1968, and in Cocks J., Watkins S. A., et al., *J. of the British Inter. Soc.*, 50, 479-484, 1997, in particular for protecting astronauts on journeys to the moon and planets following a realisation of the potential dangers to which astronauts of the NASA Apollo missions were exposed. Using magneto hydrodynamic assumptions, the amount of electrical power thought required to protect a spacecraft from charged particle radiation using magnetic and/or electrical field configurations was prohibitive. In particular, it was thought that the size of the shielded region would need to be of a size similar to the Larmor orbit of the potentially damaging charged particles, which for protons in a solar proton event is several tens to several hundreds of kilometers.

More recently, R. Bamford et al., *Plasma Phys. Control. Fusion* 50, 2008 describes a new experiment to test the shielding concept of a dipole-like magnetic field and plasma, surrounding a spacecraft to form a "mini magnetosphere". Laboratory experiments determined the effectiveness of a magnetized plasma barrier to expel an impacting, low beta supersonic flowing energetic plasma representing the solar wind. Optical and Langmuir probe data of the plasma density, the plasma flow velocity and the intensity of the dipole field show the creation of a narrow transport barrier region and diamagnetic cavity virtually devoid of energetic plasma particles. This is said to demonstrate the viability of being able to create a small "hole" in the solar wind plasma, of the order of the Larmor orbit width, in which an inhabited spacecraft could reside in relative safety. The experimental results are supported with 3D particle-in-cell hybrid code simulations.

It would be desirable to provide further improvements to the efficacy and power consumption efficiency of such a spacecraft shield, for example to reduce the effect of charged particles reaching the spacecraft along cusps in the magnetic field.

SUMMARY OF THE INVENTION

The invention provides a spacecraft shield formed using a shield magnetic field. A controller causes ongoing or continuing perturbation of the shield magnetic field to improve the shielding of the spacecraft from energetic charged particles. The shield magnetic field is preferably configured to shield the spacecraft from solar wind particles having a range of energies extending above 10 MeV, and preferably up to at least 50 MeV.

In order to increase the effectiveness of the shield at practical levels of power consumption, the shield magnetic field is preferably perturbed, varied or fluctuated in an irregular or stochastic manner. Various modes of perturbation including perturbations in magnitude, direction and more complex structural parameters may be used. Preferably, also, the ongoing perturbations are controlled to occur over characteristic timescales typically in the range of 0.001 to 1.0 seconds related to aspects of the particle and magnetic field environment around the spacecraft.

The structure of the magnetic field proximate to the boundary between the shield magnetic field and the background magnetic field (for example of the solar wind) is determined by complex interactions between the magnetic fields, and the associated plasmas including any energetic charged particles which are to be deflected away from the spacecraft. Perturbations of the shield magnetic field over appropriate timescales leads to a complex magnetic field line structure within the plasma proximate to the boundary, having a depth of the order of the electron skin depth, typically tens of meters for a local plasma density of around $1 \times 10^{11} \mathrm{m}^{-3}$. It is thought that the complex magnetic field line structure causes external energetic charged particles to be deflected away from the spacecraft by multiple small trajectory increments without completing full Larmor orbits of an equivalent strength laminar magnetic field.

In particular the invention provides a spacecraft comprising a magnetic field source, or shield source, arranged to generate a shield magnetic field to protect the spacecraft from energetic charged particles; and a source controller arranged to operate the magnetic field source so as to provide ongoing perturbation of the shield magnetic field, to thereby increase the effectiveness of the protection.

The source controller and magnetic field source are preferably adapted to generate a shield magnetic field having an average field strength of at least $1 \times 10^{-5}$ Tesla, and more preferably at least $1 \times 10^{-4}$ Tesla, at the magnetic field source. Similarly, the source controller and magnetic field source may be adapted to generate a shield magnetic field having an average strength of at least $1 \times 10^{-7}$ Tesla at a distance of at least 10 m from the source, and preferably at a distance of at least 100 m from the source.

The source controller may be arranged to cause ongoing perturbation of the shield magnetic field in one or more of: an irregular manner, a stochastic manner, and a pseudorandom manner. This perturbation is preferably maintained at effective continuous or time averaged field strengths of the overall shield such as those mentioned above over extended periods of time, for example over periods of at least ten seconds and more preferably at least 100 seconds.

The source controller may be arranged to cause ongoing perturbation of the magnetic field in one or more dynamic modes, for example selected from one or more of changes in field magnitude, changes in field direction, changes in field structure, and changes in the number, magnitude, direction and strength of dipole and optionally higher order magnetic poles.

The source controller may be arranged to cause ongoing perturbation of the shield magnetic field such that the perturbations demonstrate a characteristic timescale in the range of 0.001 to 10 seconds, and more preferably in the range of 0.01 to 0.1 seconds. The perturbations may be generated to demonstrate a characteristic dynamic range over said characteristic timescale of at least 3%, and more preferably at least 10%. This dynamic range may be over one or more dynamic modes, for example being determined according to changes in field direction, field strength and so forth.

To generate the shield magnetic field, the spacecraft may comprise a power supply arranged to deliver electrical power to the magnetic field source of at least 100 Watts, and optionally at least 500 Watts, and optionally at least 1000 Watts.

The magnetic field source may be arranged to generate the shield magnetic field with at least a quadrapole or higher order pole component. The magnetic source may comprise one or more separate coil elements, and the perturbations may be generated by fluctuations in the current applied to at least one of the coils, for example ongoing current fluctuations of at least 1%, at least 3%, or at least 10%, on the timescales mentioned above.

The source controller may comprise a computer element arranged to implement a perturbation control algorithm to thereby generate a shield control signal, and the shield control signal being used to control the magnetic field source to generate a shield magnetic field in accordance with the algorithm.

The spacecraft may comprise at least one of a solar wind particle detector and a magnetic field detector, the at least one detector being operably coupled to the source controller, and the computer element may be arranged to use measurements from the at least one detector in generating the shield control signal.

Similarly, the spacecraft may further comprise a telemetry signal receiver, wherein the computer element is arranged to used data from a received telemetry signal in generating the shield control signal.

The spacecraft may further comprise an injector element adapted to inject material into the shield magnetic field to enhance the efficacy of the shield, by increasing plasma density within a protection cavity formed by the shield magnetic field. Such an injector may also be used with a non-perturbed or substantially static shield magnetic field, which may otherwise have strength/intensity properties or be generated using driving apparatus and currents as set out above. The invention also provides corresponding methods.

The invention also provides a method of shielding a spacecraft from energetic charged particles, for example by providing a shield magnetic field as set out above. The method is preferably adapted to shield the spacecraft from protons having energies ranging above 1 MeV preferably at least up to or above 50 MeV.

BRIEF DESCRIPTION OF THE DRAWINGS

Embodiments of the invention will now be described, by way of example only, with reference to the accompanying drawings, of which.

DESCRIPTION OF EMBODIMENTS

Figure 1:
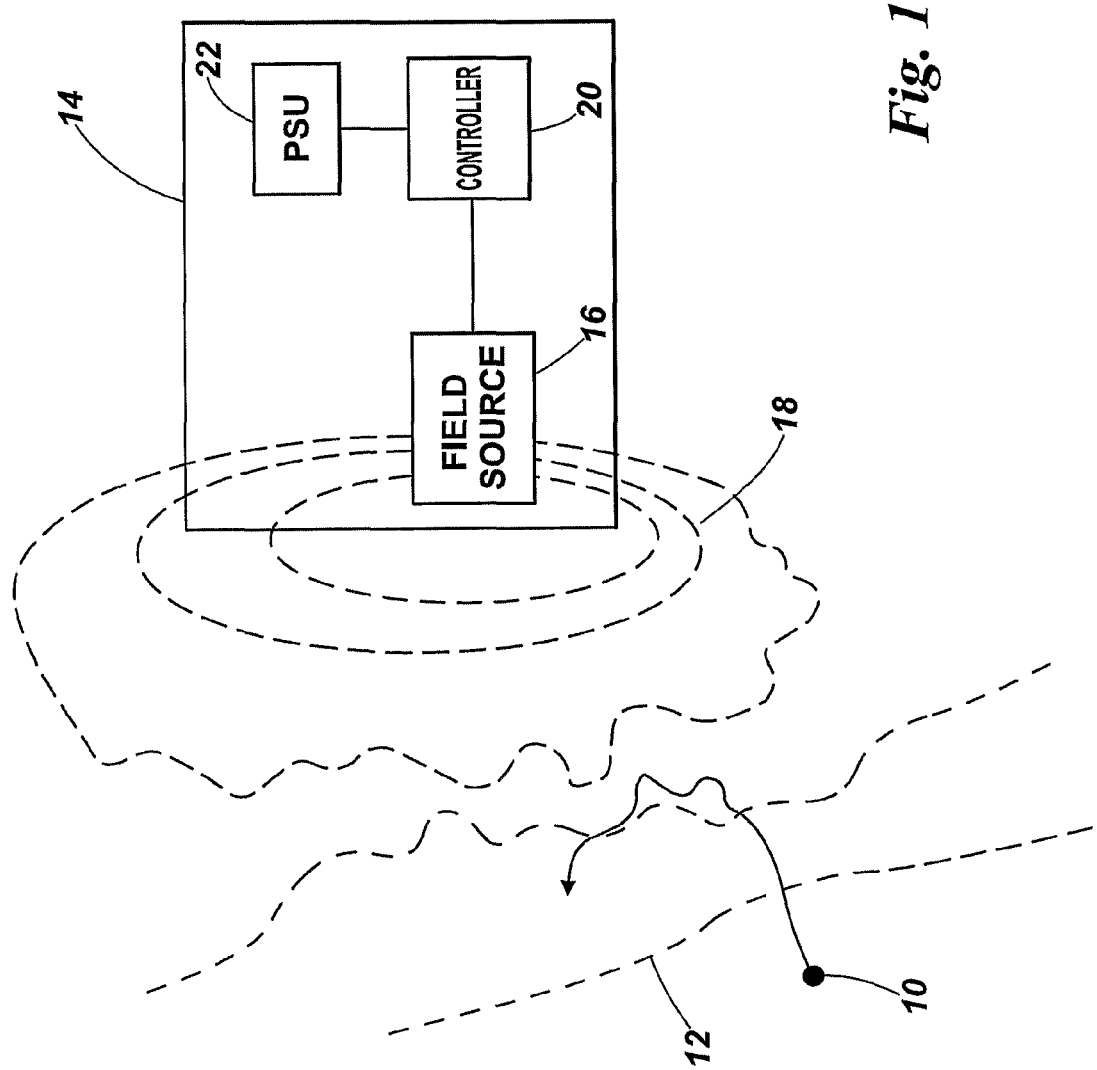
FIG. 1 is a schematic illustration of a spacecraft adapted to form a particle shield according to the invention.

Referring to FIG. 1, energetic charged particles 10 which form a plasma in association with a background magnetic field 12 approach a spacecraft 14 embodying the invention. The spacecraft 14 carries a magnetic field source 16 operable to generate a shield magnetic field 18 to protect the spacecraft 14 from the energetic charged particles 10 when the spacecraft is deployed in a space environment, for example in a geostationary orbit or interplanetary trajectory. A source controller 20 controls the operation of the magnetic field source, and therefore the configuration of the shield magnetic field proximate to the source. A power supply 22 provides power for generation of the magnetic field.

Interaction between the shield magnetic field and any enhanced density shield plasma associated therewith on the one hand, and the energetic charged particles and associated background magnetic field on the other, defines the boundary of a protective cavity around the spacecraft. This "mini-magnetosphere" acts as a barrier to energetic particles by using a combination of magnetic field and plasma. The combination of magnetic field generation and plasma which may also be released into the cavity from the spacecraft results in plasma collective effects that produce electric fields. It is the collective electric fields that are predominantly responsible for the scattering and deflection of energetic charged particles, in contrast to a single particle or MHD model where an energetic particle is deflected by a v×B force.

The source controller 20 causes the shield magnetic field at the magnetic field source to change or fluctuate, preferably irregularly or a-rhythmically. This ongoing perturbation of the shield magnetic field provides improved deflection of the energetic charged particles 10 away from the spacecraft 14. The shield magnetic field may be a substantially dipole field, or more preferably may include significant quadrapole and/or other multi-pole elements.

In order to provide an effective shield, the strength of the shield magnetic field 18 at the source 16 is preferably at least $1 \times 10^{-4}$ Tesla. To obtain a boundary between the shield magnetic field 18 and a typical solar wind background magnetic field of around $1 \times 10^{-7}$ Tesla (perhaps $5 \times 10^{-8}$ to $5 \times 10^{-6}$ Tesla depending on the conditions of the solar wind) at a distance of up to a few hundred meters from the spacecraft a field strength of less than 0.1 Tesla at the magnetic field source 16 will generally be sufficient. Allowing for effects of field persistence in the plasma environment, average electrical power from about 100 W to 10 kW, and more preferably from about 500 W to 5 kW may be provided by the power supply 22 to drive the magnetic field source to generate the shield magnetic field.

The source controller may control the source to perturb the magnetic field over time in various ways. The perturbation may be in a smoothly continuous manner or may be discontinuous to the extent inductance effects allow. Generally, however, the changes should be over a characteristic timescale or be of a characteristic frequency or frequency range which is related to the behaviour of the plasma and magnetic fields proximate to the boundary between the shield magnetic field 18 and the background field 12. At geosynchronous orbit the background magnetic field is typically about $1 \times 10^{-7}$ Tesla, so that the gyroperiod for protons is about 0.1 seconds, and about 0.2 seconds for heavier alpha particles and higher mass ions such as $C^{6+}$, $N^{7+}$ and $O^{8+}$ which are commonly found in solar energetic particle events. Perturbations or changes in the shield magnetic field over a characteristic timescale of around 0.01 to 0.1 seconds, or more generally from about 0.001 to about 1.0 seconds, are therefore appropriate and the field source, controller and power supply may be designed accordingly.

The shield magnetic field may be changed over time in one or more of several different modes, including magnitude, pole direction, and more detailed configuration details of field shape and pole structure.

The details of the timescales, dynamic ranges and modes of variation of the shield field may be selected according to the background magnetic field, the local plasma environment, and the spectrum of properties of the energetic charged particles to be deflected. Typically, however, changes in the shield magnetic field over characteristic ranges of at least 1% of average values and more preferably at least 3% or 10% in one or more of the possible modes may be appropriate.

The timescales of the perturbations may be defined, for example, as a frequency with which a point in the shield magnetic field typically changes in magnitude or direction by at least 1%, more preferably at least 3%, and optionally by 10% or more. Of course, depending on the field configuration, some parts of the field may change much more than others, so such a measure may be applied at a predetermined point such as the point of maximum change at a distance of 100 m, or an average over the surface at a distance of 100 m from the spacecraft.

Figure 2:
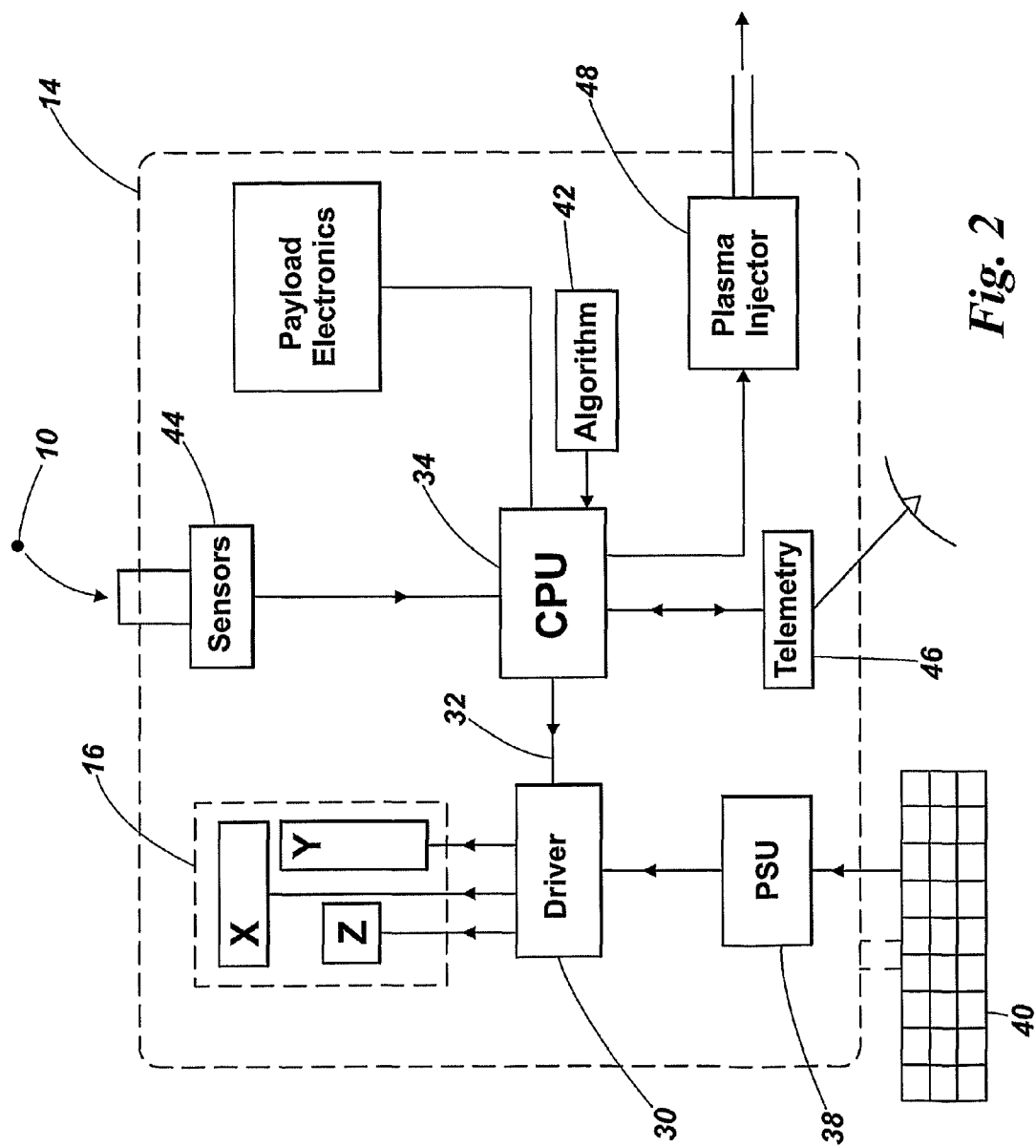
FIG. 2 illustrates the spacecraft of FIG. 1, with further exemplary details of elements which may be used to assist in the shielding process.

FIG. 2 illustrates spacecraft 14 in more detail, with various optional and examplary features. The magnetic field source 16 may comprise one or multiple coils arranged so as to generate a desired range of magnetic field configurations and perturbations. Driver circuitry 30 provides electrical power to the coils, in accordance with a shield control signal 32 received from a computer element 34. Power for the driver circuitry to apply to the magnetic field source is provided by power supply 38, which may be derived for example from a solar panel source 40.

An algorithm 42 stored in a computer memory is used by the computer element 34 to generate the shield control signal. This algorithm could take a variety of forms, for example providing stochastic or pseudo-random variations in the strength, and/or direction, and/or combinations of dipole and higher polar order components of the shield magnetic field. The perturbations may be defined in terms of the current applied to one or more of the coils of the magnetic field source, for example by requiring the current to such a coil to fluctuate by at least 1%, at least 3%, or at least 10% over the characteristic timescales discussed elsewhere in this document, for example at frequencies between 0.1 Hz and 1000 Hz, or more preferably between 1 Hz and 100 Hz.

In using the algorithm 42 to generate the control signal the computer element may also take account of input from other elements, such as one or more environmental sensors 44, and data or instructions from a telemetry receiver 46. For example, a solar wind particle sensor may be provided, and the strength of the shield magnetic field or the rate, size or nature of the perturbations may be varied according to detected particle fluxes or spectra. A solar wind magnetic field detector may be similarly used. Telemetry may be used to receive advance warnings of changes in the solar wind detected elsewhere, so that the shield magnetic field can be suitably configured in preparation for expected bursts of energetic particles.

A major element in the creation of a protective cavity may be the ability of the particular scheme to generate a shield magnetic field structure that can trap and increase the density of plasma in the cavity well beyond the density of the background medium. This is undoubtedly the case where large enhancements of the shield plasma density occur. Having a significant shield plasma density is important for setting up space charge electric fields that are responsible for the deflection of the energetic charged particles. For the energetic particles to sup up self-consistent electromagnetic fields, it is preferable to have them interact with a shield plasma with a short transition in the density. If the shield magnetic field is rippled then the shield plasma density will likewise have a similar structure and the surface of interaction will not appear to be smooth, which will help in the deflection of the particles. Incident energetic charged particles will not only see the space charge field set up by the ponderomotive force as they interact with the shield magnetic field, but will also be responsible for setting up their own space charge field by interaction directly with the shield plasma within the shield cavity. Energetic ions incident on the shield plasma will induce an attractive force on the electrons. These electrons respond almost instantaneously forming a space charge shield around the energetic ions. As a consequence of attracting the electrons and not the plasma ions, a space charge field forms that shows the incident energetic ions. For this to be effective the shield plasma that forms the barrier must be much more dense that the surrounding solar wind plasma and there should be a sharp transition between the ambient plasma and the shield plasma forming the barrier.

To this end, the spacecraft 14 may also be provided with an injector element 48 arranged to inject gas or other particles into the vicinity of the spacecraft, and in particular within a shield cavity formed by interaction of the background field 12 and incident energetic particles with the shield magnetic field and shield cavity plasma. For example, barium or lithium atoms could be released. Ionisation of these particles may then lead to an increased plasma density in the vicinity of the spacecraft, enhancing the effectiveness of the shield magnetic field.

A variety of variations and modifications to the described embodiments will be apparent to the person skilled in the art without departing from the scope of the invention.

The invention claimed is:

1. A spacecraft comprising:
a magnetic field source configured to generate a shield magnetic field to protect the spacecraft from energetic charged particles; and
a source controller configured to control the magnetic field source so as to provide ongoing perturbation of the shield magnetic field, the perturbation being ongoing independently of changes in an external environment around the spacecraft.

2. The spacecraft of claim 1 the source controller being configured to cause the ongoing perturbation of the shield magnetic field in one or more of: an irregular manner, a stochastic manner, and a continuous manner.

3. The spacecraft of claim 1 the source controller being configured to cause the ongoing perturbation of the magnetic field in one or more dynamic modes selected from: changes in magnitude; changes in direction; changes in structure; and changes in the number of magnetic poles.

4. The spacecraft of claim 1 the source controller being configured to cause the ongoing perturbation of the shield magnetic field such that the perturbations demonstrate a characteristic timescale in the range of 0.001 to 10 seconds.

5. The spacecraft of claim 4 the source controller being configured to cause the ongoing perturbation of the shield magnetic field such that the perturbations demonstrate a characteristic dynamic range over said characteristic timescale of at least 1%, at least 3%, or at least 10%, of an average value, in one or more dynamic modes.

6. The spacecraft of claim 4, the source controller being configured to cause the ongoing perturbation of the shield magnetic field such that the perturbation demonstrates a characteristic timescale in the range of 0.01 to 0.1 seconds.

7. The spacecraft of claim 1 the source controller and magnetic field source being configured to generate a shield magnetic field having an average field strength of at least $1 \times 10^{-5}$ Tesla.

8. The spacecraft of claim 7, the source controller and magnetic field source being configured to generate a shield magnetic field having an average field strength of at least $1 \times 10^{-4}$ Tesla at the magnetic field source.

9. The spacecraft of claim 1 the source controller and the magnetic field source being configured to generate a shield magnetic field having an average field strength of $1 \times 10^{-7}$ Tesla at a distance of at least 10 m, and preferably at least 100 m from the magnetic field source.

10. The spacecraft of claim 1 further comprising a power supply configured to deliver electrical power to the magnetic field source of at least 100 W.

11. The spacecraft of claim 10, the power supply being configured to deliver electrical power to the magnetic field source of at least 500 W.

12. The spacecraft of claim 1 the magnetic field source being configured to generate the shield magnetic field with at least one of a quadrapole and a higher order pole component.

13. The spacecraft of claim 1 the magnetic field source being configured to generate the shield magnetic field using one or more magnet coils.

14. The spacecraft of claim 13 the source controller being configured to cause ongoing perturbation of the shield magnetic field by varying the current in at least one of said coils.

15. The spacecraft of claim 14 the source controller being configured to cause ongoing perturbation of the shield magnetic field by varying the current in at least one of said coils, by at least 1%, or at least 3%, or at least 10%.

16. The spacecraft of claim 14 the source controller being configured to vary the current over the specified range at frequencies between 0.1 Hz and 1000 Hz.

17. The spacecraft of claim 16 the source controller being configured to vary the current over the specified range at frequencies between 1 Hz and 100 Hz.

18. The spacecraft of claim 1 the source controller comprising:
    a computer element configured to implement a perturbation control algorithm to generate a shield control signal so as to control the magnetic field source to generate a shield magnetic field in accordance with the algorithm.

19. The spacecraft of claim 18, further comprising at least one of a solar wind particle detector and a magnetic field detector, the at least one detector being operably coupled to the source controller.

20. The spacecraft of claim 19 the computer element being configured to generate the shield control signal based on measurements from the at least one detector such that a rate or size or nature of the ongoing perturbation is varied according to the measurements.

21. The spacecraft of claim 18 further comprising a telemetry signal receiver,
    the computer element being configured to generate the shield control signal based on data from a received telemetry signal.

22. The spacecraft of claim 1 further comprising an injector element configured to inject material into the shield magnetic field.

23. The spacecraft of claim 22 further comprising an increased density shield plasma formed from the material injected into the shield magnetic field, the increased shield density plasma providing increased protection of the spacecraft from said energetic charged particles.

24. A method of shielding a spacecraft from energetic charged particles comprising:
    generating a shield magnetic field with an ongoing perturbation so as to protect the spacecraft from energetic charged particles, the perturbation being ongoing independently of changes in an external environment around the spacecraft.

25. The method of claim 24, the shield being generated so as to protect the spacecraft from protons in at least some of a range of energies of 1 MeV to 50 MeV.

26. The method of claim 24, generating a shield with an ongoing perturbation including causing the ongoing perturbation by varying driving current applied to one or more magnet coils.

27. The method of claim 26, varying the driving current including varying the driving current according to a predetermined algorithm.

28. The method of claim 26, varying the driving current including varying the driving current on a characteristic timescale in the range 0.001 to 10 seconds.

29. The method of claim 28, varying the driving current including varying the driving current on a characteristic timescale in the range of 0.01 to 0.1 seconds.

30. The method of claim 24 further comprising injecting material from the spacecraft into the shield magnetic field to increase the density of plasma in a vicinity of the spacecraft.

* * * * *